US008726309B2

(12) United States Patent
Casagrande et al.

(10) Patent No.: US 8,726,309 B2
(45) Date of Patent: *May 13, 2014

(54) METHODS AND APPARATUS FOR PRESENTING SUBSTITUTE CONTENT IN AN AUDIO/VIDEO STREAM USING TEXT DATA

(75) Inventors: Steven M. Casagrande, Castle Rock, CO (US); David A. Kummer, Highlands Ranch, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 94 days.
This patent is subject to a terminal disclaimer.

(21) Appl. No.: 13/407,955

(22) Filed: Feb. 29, 2012

(65) Prior Publication Data
US 2012/0159537 A1    Jun. 21, 2012

Related U.S. Application Data

(63) Continuation of application No. 12/130,792, filed on May 30, 2008, now Pat. No. 8,156,520.

(51) Int. Cl.
*H04N 7/10*    (2006.01)
*H04N 7/173*   (2011.01)
*H04N 5/445*   (2011.01)
*H04N 9/64*    (2006.01)

(52) U.S. Cl.
USPC ............... 725/32; 725/34; 725/131; 725/134; 725/151; 348/468; 348/715; 348/718

(58) Field of Classification Search
CPC .......... H04N 21/4221; H04N 21/4856; H04N 21/4884
USPC .......... 725/34–35, 68, 85, 92, 100, 102, 131, 725/134, 135, 137; 348/468, 715, 718
See application file for complete search history.

(56) References Cited

U.S. PATENT DOCUMENTS 3,682,363 A    8/1972   Hull
3,919,479 A    11/1975  Moon
(Continued)

FOREIGN PATENT DOCUMENTS

EP    521454    1/1993
EP    594241    4/1994
(Continued)

OTHER PUBLICATIONS

USPTO "Notice of Allowance" dated Feb. 1, 2013 for U.S. Appl. No. 12/434,751.
(Continued)

*Primary Examiner* — Hai V Tran
(74) *Attorney, Agent, or Firm* — Ingrassia Fisher & Lorenz, P.C.

(57) ABSTRACT

Various embodiments of apparatus and/or methods are described for skipping, filtering and/or replacing content from an audio/video stream using text data associated with the audio/video stream. The text data is processed using location information that references a segment of the text data of the first audio/video stream to identify a location within the first audio/video stream. The location within the first audio/video stream is utilized to identify portions of the audio/video stream that are to be skipped during presentation. The portions of the audio/video stream that are to be skipped are filtered from the audio/video stream, and some of the skipped portions of the audio/video stream are replaced with substitute content. The filtered video stream, including the substitute content, is outputted for presentation to a user.

10 Claims, 7 Drawing Sheets

(56) References Cited

U.S. PATENT DOCUMENTS

| | | |
|---|---|---|
| 3,942,190 A | 3/1976 | Detweiler |
| 4,224,481 A | 9/1980 | Russell |
| 4,313,135 A | 1/1982 | Cooper |
| 4,331,974 A | 5/1982 | Cogswell et al. |
| 4,388,659 A | 6/1983 | Lemke |
| 4,404,589 A | 9/1983 | Wright, Jr. |
| 4,408,309 A | 10/1983 | Kiesling et al. |
| 4,439,785 A | 3/1984 | Leonard |
| 4,450,531 A | 5/1984 | Kenyon |
| 4,520,404 A | 5/1985 | Von Kohorn |
| 4,602,297 A | 7/1986 | Reese |
| 4,605,964 A | 8/1986 | Chard |
| 4,633,331 A | 12/1986 | McGrady et al. |
| 4,665,431 A | 5/1987 | Cooper |
| 4,697,209 A | 9/1987 | Kiewit |
| 4,706,121 A | 11/1987 | Young |
| 4,739,398 A | 4/1988 | Thomas |
| 4,750,213 A | 6/1988 | Novak |
| 4,755,889 A | 7/1988 | Schwartz |
| 4,760,442 A | 7/1988 | O'Connell et al. |
| 4,761,694 A | 8/1988 | Shudo et al. |
| 4,789,961 A | 12/1988 | Tindall |
| 4,805,217 A | 2/1989 | Morihiro et al. |
| 4,816,905 A | 3/1989 | Tweedy et al. |
| 4,833,710 A | 5/1989 | Hirashima |
| 4,876,670 A | 10/1989 | Nakabayashi |
| 4,888,769 A | 12/1989 | Deal |
| 4,891,715 A | 1/1990 | Levy |
| 4,897,867 A | 1/1990 | Foster et al. |
| 4,916,682 A | 4/1990 | Tomoda et al. |
| 4,918,730 A | 4/1990 | Schulze |
| 4,920,533 A | 4/1990 | Dufresne et al. |
| 4,930,160 A | 5/1990 | Vogel |
| 4,939,594 A | 7/1990 | Moxon et al. |
| 4,947,244 A | 8/1990 | Fenwick et al. |
| 4,949,169 A | 8/1990 | Lumelsky et al. |
| 4,949,187 A | 8/1990 | Cohen |
| 4,963,866 A | 10/1990 | Duncan |
| 4,963,995 A | 10/1990 | Lang |
| 4,972,190 A | 11/1990 | Primeau et al. |
| 4,974,085 A | 11/1990 | Campbell et al. |
| RE33,535 E | 2/1991 | Cooper |
| 4,991,033 A | 2/1991 | Takeshita |
| 5,014,125 A | 5/1991 | Pocock et al. |
| 5,018,014 A | 5/1991 | Hashimoto |
| 5,057,932 A | 10/1991 | Lang |
| 5,063,453 A | 11/1991 | Yoshimura et al. |
| 5,093,718 A | 3/1992 | Hoarty et al. |
| 5,121,476 A | 6/1992 | Yee |
| 5,126,852 A | 6/1992 | Nishino et al. |
| 5,126,982 A | 6/1992 | Yifrach |
| 5,130,792 A | 7/1992 | Tindell et al. |
| 5,132,992 A | 7/1992 | Yurt et al. |
| 5,134,499 A | 7/1992 | Sata et al. |
| 5,168,353 A | 12/1992 | Walker |
| 5,191,410 A | 3/1993 | McCalley et al. |
| 5,202,761 A | 4/1993 | Cooper |
| 5,227,876 A | 7/1993 | Cucchi et al. |
| 5,233,423 A | 8/1993 | Jernigan et al. |
| 5,241,428 A | 8/1993 | Goldwasser et al. |
| 5,245,430 A | 9/1993 | Nishimura |
| 5,247,347 A | 9/1993 | Litteral et al. |
| 5,253,275 A | 10/1993 | Yurt et al. |
| 5,311,423 A | 5/1994 | Clark |
| 5,329,320 A | 7/1994 | Yifrach |
| 5,333,091 A | 7/1994 | Iggulden |
| 5,357,276 A | 10/1994 | Banker et al. |
| 5,361,261 A | 11/1994 | Edem et al. |
| 5,371,551 A | 12/1994 | Logan et al. |
| 5,412,416 A | 5/1995 | Nemirofsky |
| 5,414,455 A | 5/1995 | Hooper et al. |
| 5,434,678 A | 7/1995 | Abecassis |
| 5,438,423 A | 8/1995 | Lynch et al. |
| 5,440,334 A | 8/1995 | Walters et al. |
| 5,442,390 A | 8/1995 | Hooper et al. |
| 5,442,455 A | 8/1995 | Hioki et al. |
| 5,452,006 A | 9/1995 | Auld |
| 5,453,790 A | 9/1995 | Vermeulen et al. |
| 5,461,415 A | 10/1995 | Wolf et al. |
| 5,461,428 A | 10/1995 | Yoo |
| 5,477,263 A | 12/1995 | O'Callaghan et al. |
| 5,481,542 A | 1/1996 | Logston et al. |
| 5,508,940 A | 4/1996 | Rossmer et al. |
| 5,510,905 A | 4/1996 | Birk |
| 5,513,011 A | 4/1996 | Matsumoto et al. |
| 5,517,250 A | 5/1996 | Hoogenboom et al. |
| 5,521,630 A | 5/1996 | Chen et al. |
| 5,528,282 A | 6/1996 | Voeten et al. |
| 5,533,021 A | 7/1996 | Branstad et al. |
| 5,535,137 A | 7/1996 | Rossmere et al. |
| 5,535,229 A | 7/1996 | Hain, Jr. et al. |
| 5,537,408 A | 7/1996 | Branstad et al. |
| 5,541,919 A | 7/1996 | Young et al. |
| 5,550,594 A | 8/1996 | Cooper et al. |
| 5,553,005 A | 9/1996 | Voeten et al. |
| 5,555,463 A | 9/1996 | Staron et al. |
| 5,555,555 A | 9/1996 | Sato et al. |
| 5,557,538 A | 9/1996 | Reter et al. |
| 5,557,541 A | 9/1996 | Schulhof et al. |
| 5,559,999 A | 9/1996 | Maturi et al. |
| 5,563,714 A | 10/1996 | Inoue et al. |
| 5,572,261 A | 11/1996 | Cooper |
| 5,574,662 A | 11/1996 | Windrem et al. |
| 5,581,479 A | 12/1996 | McLaughlin et al. |
| 5,583,561 A | 12/1996 | Baker et al. |
| 5,583,652 A | 12/1996 | Ware |
| 5,586,264 A | 12/1996 | Belknap et al. |
| 5,600,364 A | 2/1997 | Hendricks et al. |
| 5,603,058 A | 2/1997 | Belknap et al. |
| 5,604,544 A | 2/1997 | Bertram |
| 5,610,653 A | 3/1997 | Abecassis |
| 5,614,940 A | 3/1997 | Cobbley |
| 5,619,335 A | 4/1997 | Tsinberg et al. |
| 5,619,337 A | 4/1997 | Naimpally |
| 5,625,464 A | 4/1997 | Compoint et al. |
| 5,629,732 A | 5/1997 | Moskowitz et al. |
| 5,642,171 A | 6/1997 | Baumgartner et al. |
| 5,648,824 A | 7/1997 | Dunn |
| 5,659,539 A | 8/1997 | Porter et al. |
| 5,664,044 A | 9/1997 | Ware |
| 5,668,948 A | 9/1997 | Belknap et al. |
| 5,675,388 A | 10/1997 | Cooper |
| 5,682,488 A | 10/1997 | Gleason et al. |
| 5,684,918 A | 11/1997 | Abecassis |
| 5,692,093 A | 11/1997 | Iggulden |
| 5,696,866 A | 12/1997 | Iggulden |
| 5,696,868 A | 12/1997 | Kim et al. |
| 5,696,869 A | 12/1997 | Abecassis |
| 5,701,383 A | 12/1997 | Russo et al. |
| 5,703,655 A | 12/1997 | Corey |
| 5,706,388 A | 1/1998 | Isaka |
| 5,712,976 A | 1/1998 | Falcon, Jr. et al. |
| D390,839 S | 2/1998 | Yamamoto et al. |
| 5,715,356 A | 2/1998 | Hirayama et al. |
| 5,719,982 A | 2/1998 | Kawamura et al. |
| 5,721,815 A | 2/1998 | Ottesen et al. |
| 5,721,878 A | 2/1998 | Ottesen et al. |
| D392,269 S | 3/1998 | Mason et al. |
| 5,724,474 A | 3/1998 | Oguro et al. |
| 5,742,730 A | 4/1998 | Couts |
| 5,751,282 A | 5/1998 | Girard et al. |
| 5,751,883 A | 5/1998 | Ottesen et al. |
| 5,761,417 A | 6/1998 | Henley et al. |
| 5,774,170 A | 6/1998 | Hite et al. |
| 5,774,186 A | 6/1998 | Brodsky |
| 5,778,137 A | 7/1998 | Nielsen et al. |
| 5,805,763 A | 9/1998 | Lawler et al. |
| 5,805,821 A | 9/1998 | Saxena et al. |
| 5,808,607 A | 9/1998 | Brady et al. |
| 5,815,689 A | 9/1998 | Shaw et al. |
| 5,822,493 A | 10/1998 | Uehara et al. |
| 5,848,217 A | 12/1998 | Tsukagoshi et al. |

(56) References Cited

U.S. PATENT DOCUMENTS

| | | |
|---|---|---|
| 5,864,682 A | 1/1999 | Porter et al. |
| 5,870,553 A | 2/1999 | Shaw et al. |
| 5,889,915 A | 3/1999 | Hewton |
| 5,892,536 A | 4/1999 | Logan |
| 5,892,884 A | 4/1999 | Sugiyama et al. |
| 5,899,578 A | 5/1999 | Yanagihara et al. |
| 5,920,572 A | 7/1999 | Washington et al. |
| 5,930,444 A | 7/1999 | Camhi et al. |
| 5,930,493 A | 7/1999 | Ottesen et al. |
| 5,949,954 A | 9/1999 | Young et al. |
| 5,953,485 A | 9/1999 | Abecassis |
| 5,956,716 A | 9/1999 | Kenner et al. |
| 5,973,679 A | 10/1999 | Abbott et al. |
| 5,987,210 A | 11/1999 | Iggulden |
| 5,995,709 A | 11/1999 | Tsuge |
| 5,999,688 A | 12/1999 | Iggulden |
| 5,999,691 A | 12/1999 | Takagi et al. |
| 6,002,832 A | 12/1999 | Yoneda |
| 6,005,562 A | 12/1999 | Shiga et al. |
| 6,005,564 A | 12/1999 | Ahmad et al. |
| 6,005,603 A | 12/1999 | Flavin |
| 6,011,594 A | 1/2000 | Takashima |
| 6,018,612 A | 1/2000 | Thomason et al. |
| 6,028,599 A | 2/2000 | Yuen et al. |
| 6,055,495 A | 4/2000 | Tucker et al. |
| D424,543 S | 5/2000 | Hodgson |
| 6,057,893 A | 5/2000 | Kojima et al. |
| D426,208 S | 6/2000 | Hodgson |
| D426,209 S | 6/2000 | Hodgson |
| 6,088,455 A | 7/2000 | Logan |
| 6,091,886 A | 7/2000 | Abecassis |
| RE36,801 E | 8/2000 | Logan et al. |
| 6,100,941 A | 8/2000 | Dimitrova et al. |
| 6,112,226 A | 8/2000 | Weaver et al. |
| 6,138,147 A | 10/2000 | Weaver et al. |
| 6,151,444 A | 11/2000 | Abecassis |
| 6,163,644 A | 12/2000 | Owashi et al. |
| 6,167,083 A | 12/2000 | Sporer et al. |
| 6,169,843 B1 | 1/2001 | Lenihan et al. |
| 6,192,189 B1 | 2/2001 | Fujinami et al. |
| 6,198,877 B1 | 3/2001 | Kawamura et al. |
| 6,208,804 B1 | 3/2001 | Ottesen et al. |
| 6,208,805 B1 | 3/2001 | Abecassis |
| 6,226,447 B1 | 5/2001 | Sasaki et al. |
| 6,232,926 B1 | 5/2001 | Nguyen et al. |
| 6,233,389 B1 | 5/2001 | Barton |
| 6,243,676 B1 | 6/2001 | Witteman |
| 6,278,837 B1 | 8/2001 | Yasukohchi et al. |
| 6,285,824 B1 | 9/2001 | Yanagihara et al. |
| 6,304,714 B1 | 10/2001 | Krause et al. |
| 6,330,675 B1 | 12/2001 | Wiser et al. |
| 6,335,730 B1 | 1/2002 | Gould |
| 6,341,195 B1 | 1/2002 | Mankovitz et al. |
| D454,574 S | 3/2002 | Wasko et al. |
| 6,400,407 B1 | 6/2002 | Zigmond et al. |
| 6,408,128 B1 | 6/2002 | Abecassis |
| 6,424,791 B1 | 7/2002 | Saib |
| 6,425,127 B1 | 7/2002 | Bates et al. |
| 6,445,738 B1 | 9/2002 | Zdepski et al. |
| 6,445,872 B1 | 9/2002 | Sano et al. |
| 6,452,615 B1 | 9/2002 | Chiu et al. |
| 6,490,000 B1 | 12/2002 | Schaefer et al. |
| 6,498,894 B2 | 12/2002 | Ito et al. |
| 6,504,990 B1 | 1/2003 | Abecassis |
| D470,153 S | 2/2003 | Billmaier et al. |
| 6,529,685 B2 | 3/2003 | Ottesen et al. |
| 6,542,695 B1 | 4/2003 | Akiba et al. |
| 6,553,178 B2 | 4/2003 | Abecassis |
| 6,574,594 B2 | 6/2003 | Pitman |
| 6,677,967 B2 | 1/2004 | Sawano et al. |
| 6,698,020 B1 | 2/2004 | Zigmond |
| 6,701,355 B1 | 3/2004 | Brandt et al. |
| 6,718,551 B1 | 4/2004 | Swix |
| 6,760,017 B1 | 7/2004 | Banerjee et al. |
| 6,788,882 B1 | 9/2004 | Geer et al. |
| D499,740 S | 12/2004 | Ombao et al. |
| 6,850,691 B1 | 2/2005 | Stam et al. |
| 6,871,006 B1 | 3/2005 | Oguz et al. |
| 6,931,451 B1 | 8/2005 | Logan |
| 6,978,470 B2 | 12/2005 | Swix |
| 7,032,177 B2 | 4/2006 | Novak |
| 7,032,179 B2 | 4/2006 | Mack et al. |
| D521,521 S | 5/2006 | Jewitt et al. |
| 7,055,166 B1 | 5/2006 | Logan |
| 7,058,376 B2 | 6/2006 | Logan |
| 7,072,849 B1 | 7/2006 | Filepp et al. |
| 7,110,658 B1 | 9/2006 | Iggulden |
| 7,187,884 B2 | 3/2007 | Bardolatzy et al. |
| 7,197,758 B1 | 3/2007 | Blackketter et al. |
| D539,809 S | 4/2007 | Totten et al. |
| 7,243,362 B2 | 7/2007 | Swix |
| 7,251,413 B2 | 7/2007 | Dow |
| 7,266,832 B2 | 9/2007 | Miller |
| 7,272,298 B1 | 9/2007 | Lang et al. |
| D554,140 S | 10/2007 | Armendariz |
| D558,220 S | 12/2007 | Maitlen et al. |
| 7,319,761 B2 | 1/2008 | Bianchi et al. |
| 7,320,137 B1 | 1/2008 | Novak |
| 7,376,469 B2 | 5/2008 | Eischeid et al. |
| 7,430,360 B2 | 9/2008 | Abecassis |
| D596,646 S | 7/2009 | Wani |
| D604,308 S | 11/2009 | Takano |
| 7,631,331 B2 | 12/2009 | Sie |
| 7,634,785 B2 | 12/2009 | Smith |
| 7,661,121 B2 | 2/2010 | Smith |
| 7,801,910 B2 * | 9/2010 | Houh et al. ............ 725/120 |
| 7,889,964 B1 * | 2/2011 | Barton et al. ............ 386/241 |
| 2002/0069218 A1 | 6/2002 | Sull et al. |
| 2002/0088010 A1 | 7/2002 | Dudkiewicz et al. |
| 2002/0090198 A1 | 7/2002 | Rosenberg |
| 2002/0092017 A1 | 7/2002 | Klosterman |
| 2002/0092022 A1 | 7/2002 | Dudkicwicz |
| 2002/0097235 A1 | 7/2002 | Rosenberg |
| 2002/0120925 A1 | 8/2002 | Logan |
| 2002/0124249 A1 | 9/2002 | Shintani et al. |
| 2002/0131511 A1 | 9/2002 | Zenoni |
| 2002/0169540 A1 | 11/2002 | Engstrom |
| 2002/0184047 A1 | 12/2002 | Plotnick |
| 2003/0005052 A1 | 1/2003 | Feuer |
| 2003/0031455 A1 | 2/2003 | Sagar |
| 2003/0031458 A1 | 2/2003 | Takahashi |
| 2003/0066078 A1 | 4/2003 | Bjorgan |
| 2003/0084451 A1 | 5/2003 | Pierzga |
| 2003/0093790 A1 | 5/2003 | Logan |
| 2003/0154128 A1 | 8/2003 | Liga |
| 2003/0192060 A1 | 10/2003 | Levy |
| 2003/0194213 A1 | 10/2003 | Schultz et al. |
| 2003/0202773 A1 | 10/2003 | Dow |
| 2003/0231854 A1 | 12/2003 | Derrenberger |
| 2004/0010807 A1 | 1/2004 | Urdang |
| 2004/0040042 A1 | 2/2004 | Feinleib |
| 2004/0049780 A1 | 3/2004 | Gee |
| 2004/0083484 A1 | 4/2004 | Ryal |
| 2004/0172650 A1 | 9/2004 | Hawkins et al. |
| 2004/0177317 A1 | 9/2004 | Bradstreet |
| 2004/0189873 A1 | 9/2004 | Konig |
| 2004/0190853 A1 | 9/2004 | Dow |
| 2004/0226035 A1 | 11/2004 | Hauser, Jr. |
| 2004/0244035 A1 | 12/2004 | Wright et al. |
| 2004/0255330 A1 | 12/2004 | Logan |
| 2004/0255334 A1 | 12/2004 | Logan |
| 2004/0255336 A1 | 12/2004 | Logan |
| 2005/0005308 A1 | 1/2005 | Logan |
| 2005/0020223 A1 | 1/2005 | Ellis et al. |
| 2005/0025469 A1 | 2/2005 | Geer et al. |
| 2005/0044561 A1 | 2/2005 | McDonald |
| 2005/0076359 A1 | 4/2005 | Pierson et al. |
| 2005/0081252 A1 | 4/2005 | Chefalas |
| 2005/0114214 A1 | 5/2005 | Itoh |
| 2005/0132418 A1 | 6/2005 | Barton et al. |
| 2005/0262539 A1 | 11/2005 | Barton |
| 2006/0013555 A1 | 1/2006 | Poslinski |
| 2006/0015925 A1 | 1/2006 | Logan |
| 2006/0059426 A1 | 3/2006 | Ogikubo |

(56) References Cited

U.S. PATENT DOCUMENTS

| | | |
|---|---|---|
| 2006/0115058 A1 | 6/2006 | Alexander et al. |
| 2006/0143567 A1 | 6/2006 | Chiu et al. |
| 2006/0168630 A1 | 7/2006 | Davies |
| 2006/0218617 A1 | 9/2006 | Bradstreet |
| 2006/0277564 A1 | 12/2006 | Jarman |
| 2006/0277569 A1 | 12/2006 | Smith |
| 2006/0280437 A1 | 12/2006 | Logan |
| 2006/0288374 A1 | 12/2006 | Ferris |
| 2006/0288392 A1 | 12/2006 | Fleming |
| 2007/0050827 A1 | 3/2007 | Gibbon |
| 2007/0101394 A1 | 5/2007 | Fu et al. |
| 2007/0113250 A1 | 5/2007 | Logan |
| 2007/0124758 A1 | 5/2007 | Sung |
| 2007/0136742 A1 | 6/2007 | Sparrell |
| 2007/0156739 A1 | 7/2007 | Black |
| 2007/0168543 A1 | 7/2007 | Krikorian |
| 2007/0199013 A1 | 8/2007 | Samari et al. |
| 2007/0204288 A1 | 8/2007 | Candelore |
| 2007/0212030 A1 | 9/2007 | Koga et al. |
| 2007/0214473 A1 | 9/2007 | Barton |
| 2007/0276926 A1 | 11/2007 | Lajoie |
| 2007/0300249 A1 | 12/2007 | Smith et al. |
| 2007/0300250 A1 | 12/2007 | Smith et al. |
| 2007/0300258 A1 | 12/2007 | O'Connor |
| 2008/0013927 A1 | 1/2008 | Kelly et al. |
| 2008/0036917 A1 | 2/2008 | Pascarella |
| 2008/0052739 A1 | 2/2008 | Logan |
| 2008/0059997 A1 | 3/2008 | Plotnick et al. |
| 2008/0112690 A1 | 5/2008 | Shahraray et al. |
| 2008/0155627 A1 | 6/2008 | O'Connor |
| 2008/0183587 A1 | 7/2008 | Joo et al. |
| 2008/0250450 A1 | 10/2008 | Larner et al. |
| 2008/0267584 A1 | 10/2008 | Green |
| 2008/0276266 A1* | 11/2008 | Huchital et al. ................ 725/32 |
| 2009/0093278 A1 | 4/2009 | Negron et al. |
| 2009/0129747 A1 | 5/2009 | Casagrande |
| 2009/0133092 A1 | 5/2009 | Casagrande |
| 2009/0133093 A1 | 5/2009 | Hodge |
| 2009/0238536 A1 | 9/2009 | Gratton |
| 2009/0271826 A1 | 10/2009 | Lee et al. |
| 2009/0300699 A1 | 12/2009 | Casagrande et al. |
| 2009/0303040 A1 | 12/2009 | Srinivasa et al. |
| 2009/0304358 A1 | 12/2009 | Rashkovskiy |
| 2010/0031162 A1 | 2/2010 | Wiser et al. |
| 2010/0053452 A1 | 3/2010 | Abe et al. |
| 2010/0138761 A1 | 6/2010 | Barnes |
| 2010/0158484 A1 | 6/2010 | Casagrande et al. |
| 2010/0162291 A1 | 6/2010 | Casagrande et al. |
| 2010/0162344 A1 | 6/2010 | Casagrande et al. |
| 2010/0322592 A1 | 12/2010 | Casagrande |
| 2011/0194838 A1 | 8/2011 | Meijer |
| 2011/0197224 A1 | 8/2011 | Meijer |
| 2011/0200300 A1 | 8/2011 | Barton et al. |
| 2012/0057847 A1 | 3/2012 | Casagrande |
| 2012/0057848 A1 | 3/2012 | Casagrande |

FOREIGN PATENT DOCUMENTS

| | | |
|---|---|---|
| EP | 785675 | 7/1997 |
| EP | 2061239 A2 | 5/2009 |
| GB | 2320637 | 6/1998 |
| JP | 06-233234 | 8/1994 |
| JP | 06-245157 | 9/1994 |
| JP | 07-111629 | 4/1995 |
| JP | 07-131754 | 5/1995 |
| JP | 07-250305 | 9/1995 |
| JP | 07-264529 | 10/1995 |
| JP | 2001 359079 | 12/2001 |
| JP | 2003153114 | 5/2003 |
| JP | 2006 262057 | 9/2006 |
| JP | 2008131150 A | 6/2008 |
| WO | WO 92/22983 | 12/1992 |
| WO | WO 95/32584 | 11/1995 |
| WO | 0223903 A | 3/2002 |

OTHER PUBLICATIONS

China State Intellectual Property Office "Office Action" dated Feb. 4, 2013 for Chinese Patent Appln. No. 200980109447.X.

USPTO "Final Office Action" dated Feb. 4, 2013 for U.S. Appl. No. 12/434,746.

USPTO "Final Office Action" dated Mar. 15, 2013 for U.S. Appl. No. 12/052,623.

USPTO "Notice of Allowance" dated Mar. 26, 2013 for U.S. Appl. No. 12/486,641.

USPTO "Final Office Action" dated Mar. 28, 2013 for U.S. Appl. No. 12/135,360.

European Patent Office, "European Search Report" mailed Feb. 24, 2012; International Appln. No. 08169362.4-1241/2061239.

USPTO "Final Office Action" mailed May 10, 2012; U.S. Appl. No. 12/486,641, filed Jun. 17, 2009.

Australian Patent Office "Patent Examination Report No. 2" mailed Jul. 12, 2012 for AU Patent Appln. 2009225834.

USPTO "Final Office Action" mailed Aug. 1, 2012 for U.S. Appl. No. 12/434,751, filed May 4, 2009.

USPTO "Final Office Action" mailed Jul. 19, 2012 for U.S. Appl. No. 12/434,742, filed May 4, 2009.

Japan Patent Office "Notice of Rejection Ground" mailed Sep. 4, 2012 for Japanese Patent Appln. No. 2011-500879.

Canadian Patent Office "Office Action" mailed Jul. 23, 2012 for Canadian Patent Appln. No. 2,717,933.

USPTO "Non-Final Office Action" mailed Sep. 6, 2012 for U.S. Appl. No. 12/135,360, filed Jun. 9, 2008.

USPTO "Non-Final Office Action" mailed Sep. 25, 2012 for U.S. Appl. No. 12/052,623, filed Mar. 20, 2008.

Dimitrova, N., et al, "Real Time Commercial Detection Using MPEG Features", Philips Research.

"Paramount Pictures Corp. v. ReplayTV & SonicBlue", http://www.eff.org/IP/Video/Paramount v. ReplayTV/20011031_complaint.html, Complaint Filed, (Oct. 30, 2001).

Manjoo, Farhad, "They Know What You're Watching", Wired News, http://www.wired.com/news/politics/0.1283.52302.00.html, (May 2, 2002).

Haughey, Matt, "EFF's ReplayTV Suit Ends", http://www.pvrblog.com/pvr/2004/01/effs_replaytv_s.html, (Jan. 12, 2004).

Mizutani, Masami, et al, "Commercial Detection in Heterogeneous Video Streams Using Fused Multi-Modal and Temporal Features", IEEE ICASSP, 2005, Philadelphia, (Mar. 22, 2005).

Tew, Chris, "How MythTV Detects Commercials", http://www.pvrwire.com/2006/10/27/how-mythtv-detects-commercials/, (Oct. 27, 2006).

RCA, "RCA DRC8060N DVD Recorder", http://www.pricegrabber.com/rating_getprodrev.php/product_id=12462074/id, PriceGrabber.com, (Jan. 26, 2007).

"How to Write a New Method of Commercial Detection", MythTV, http://www.mythtv.org/wiki/index.php/How to Write a New Method of Commercial Detection, (Jan. 26, 2007).

"Comskip", http://www.kaashoek.com/comskip/, commercial detector, (Jan. 26, 2007).

OA mailed on May 24, 2010 for U.S. Appl. No. 11/942,896, filed Nov. 20, 2007 in the name of Hodge.

ISR for PCT/US2009/037183 mailed on Jul. 15, 2009.

USPTO "Non-Final Office Action" mailed Oct. 16, 2012 for U.S. Appl. No. 12/486,641, filed Jun. 17, 2009.

China State Intellectual Property Office "Office Action" mailed Sep. 24, 2012 for China Appln. No. 200980109447.X.

Pogue, David "Networks Start to Offer TV on the Web" The New York Times, Oct. 18, 2007; retrieved from the internet at http://www.nytimes.com/007/10/18/technology/circuits/18pogue.html?pagewanted=print on Aug. 1, 2012.

TIVO "TIVO Launches Remote Scheduling With Verizon Wireless," Mar. 14, 2007.

Associated Press "AT&T Lets Mobile Phones Control Your Television," Mar. 6, 2007.

Canadian Intellectual Property Office "Office Action" dated Dec. 5, 2012 for Canadian Patent Appln. No. 2,665,855.

USPTO "Final Office Action" mailed Oct. 17, 2012 for U.S. Appl. No. 12/703,049, filed Dec. 9, 2010.

(56) References Cited

OTHER PUBLICATIONS

USPTO "Final Office Action" mailed Jan. 24, 2013 for U.S. Appl. No. 12/486,641, filed Jun. 17, 2009.
USPTO "Notice of Allowance" mailed Jan. 18, 2013 for U.S. Appl. No. 12/434,742, filed May 4, 2009.
Canadian Intellectual Property Office, "Office Action" mailed Feb. 27, 2012; Canadian Appln. No. 2,665,850.
Casagrande "Office Action Response" filed Sep. 2, 2011 for U.S. Appl. No. 11/942,111.
Casagrande "Office Action Response" filed on Sep. 7, 2011 for U.S. Appl. No. 11/942,901.
USPTO "Notice of Allowance" mailed on Sep. 27, 2011 for U.S. Appl. No. 11/942,901 in the name of Casagrande.
USPTO "Notice of Allowance" mailed on Oct. 14, 2011 for U.S. Appl. No. 11/942,111 in the name of Casagrande.
China State Intellectual Property Office "First Office Action" mailed on Oct. 28, 2011 for Chinese Application No. 200980109447.X.
Canadian Intellectual Property Office "Office Action" mailed on Jun. 27, 2011 for Canadian Application 2,665,855.
USPTO "Non-Final Office Action" mailed Jan. 30, 2012 for U.S. Appl. No. 12/486,641 in the name of Casagrande.
USPTO "Notice of Allowance" mailed Dec. 5, 2011 for U.S. Appl. No. 12/130,792 in the name of Casagrande.
USPTO "Non-Final Office Action" mailed Feb. 7, 2012 for U.S. Appl. No. 12/434,742 in the name of Casagrande.
USPTO "Non-Final Office Action" mailed Feb. 13, 2012 for U.S. Appl. No. 12/434,746 in the name of Casagrande.
USPTO "Non-Final Office Action" mailed Feb. 16, 2012 for U.S. Appl. No. 12/434,751 in the name of Casagrande.
USPTO "Notice of Allowance" mailed Jan. 27, 2012 for U.S. Appl. No. 11/942,896 in the name of Hodge.
Australian Patent Office "Office Action" mailed on Jun. 9, 2011 for Australian Application No. 2009225834.
Canadian Intellectual Property Office "Office Action" mailed on Aug. 31, 2011 for Canadian Application 2,717,933.
Casagrande "Office Action Response" filed Aug. 15, 2011 for U.S. Appl. No. 12/130,792.
USPTO "Advisory Action" mailed Jul. 1, 2011 for U.S. Appl. No. 12/130,792 in the name of Casagrande.
Casagrande "Office Action Response" filed Aug. 15, 2011 for U.S. Appl. No. 12/135,360.
Casagrande "Office Action Response" filed Jun. 13, 2011 for U.S. Appl. No. 12/130,792.
USPTO "Non-Final Office Action" mailed Oct. 3, 2011 for U.S. Appl. No. 11/942,896 in the name of Hodge.
USPTO "Final Office Action" mailed Apr. 14, 2011 for U.S. Appl. No. 12/130,792 in the name of Casagrande.
USPTO "Final Office Action" mailed Apr. 27, 2011 for U.S. Appl. No. 12/135,360 in the name of Casagrande.
USPTO "Non-Final Office Action" mailed Jun. 2, 2011 for U.S. Appl. No. 11/942,111 in the name of Casagrande.
Satterwhite Brandon et al. "Automatic Detection of TV Commercials" IEEE Potentials, Apr./May 2004.
USPTO "Non-Final Office Action" mailed Jun. 7, 2011 for U.S. Appl. No. 11/942,901 in the name of Casagrande.
European Patent Office "Inviatation to Pay Additional Fees and Partial Search Report" mailed May 16, 2011 for International Appln. PCT/EP2011/051335 filed Jan. 31, 2011.
USPTO "Final Office Action" mailed Jan. 31, 2012 for U.S. Appl. No. 12/052,623 in the name of Gratton.
European Patent Office "International Search Report" mailed Oct. 1, 2010; International Appln. No. PCT/US2010/038836, filed Jun. 16, 2010.
European Patent Office "Invitation to Pay Fees and Partial Search Report" for PCT/EP2011/051335 mailed May 16, 2011.
USPTO "Notice of Allowance" dated Aug. 12, 2013 for U.S. Appl. No. 12/052,623.
European Patent Office "Examination Report" dated Aug. 16, 2013 for European Patent Application No. 09801627.2.
European Patent Office "Examination Report" dated Aug. 16, 2013 for European Patent Application No. 11152790.9.
European Patent Office "Examination Report" dated Aug. 21, 2013 for European Patent Application No. 10 732 771.0.
USPTO "Notice of Allowance" dated Sep. 13, 2013 for U.S. Appl. No. 12/434,746.

* cited by examiner

METHODS AND APPARATUS FOR PRESENTING SUBSTITUTE CONTENT IN AN AUDIO/VIDEO STREAM USING TEXT DATA

CROSS-REFERENCE TO RELATED APPLICATION(S)

This application is a continuation of U.S. patent application Ser. No. 12/130,792, filed May 30, 2008, published as United States Patent Application Publication number US 2009/0300699, and issued on Apr. 10, 2012 as U.S. Pat. No. 8,156,520.

BACKGROUND

Digital video recorders (DVRs) and personal video recorders (PVRs) allow viewers to record video in a digital format to a disk drive or other type of storage medium for later playback. DVRs are often incorporated into set-top boxes for satellite and cable television services. A television program stored on a set-top box allows a viewer to perform time shifting functions, (e.g., watch a television program at a different time than it was originally broadcast). However, commercials within the recording may be time sensitive, and may no longer be relevant to the user when they finally get around to watching the program. Thus, the user is essentially presented with commercials and other advertisements which are of little use to both the advertiser and the viewer.

BRIEF DESCRIPTION OF THE DRAWINGS

The same number represents the same element or same type of element in all drawings.

DETAILED DESCRIPTION

Figure 1:
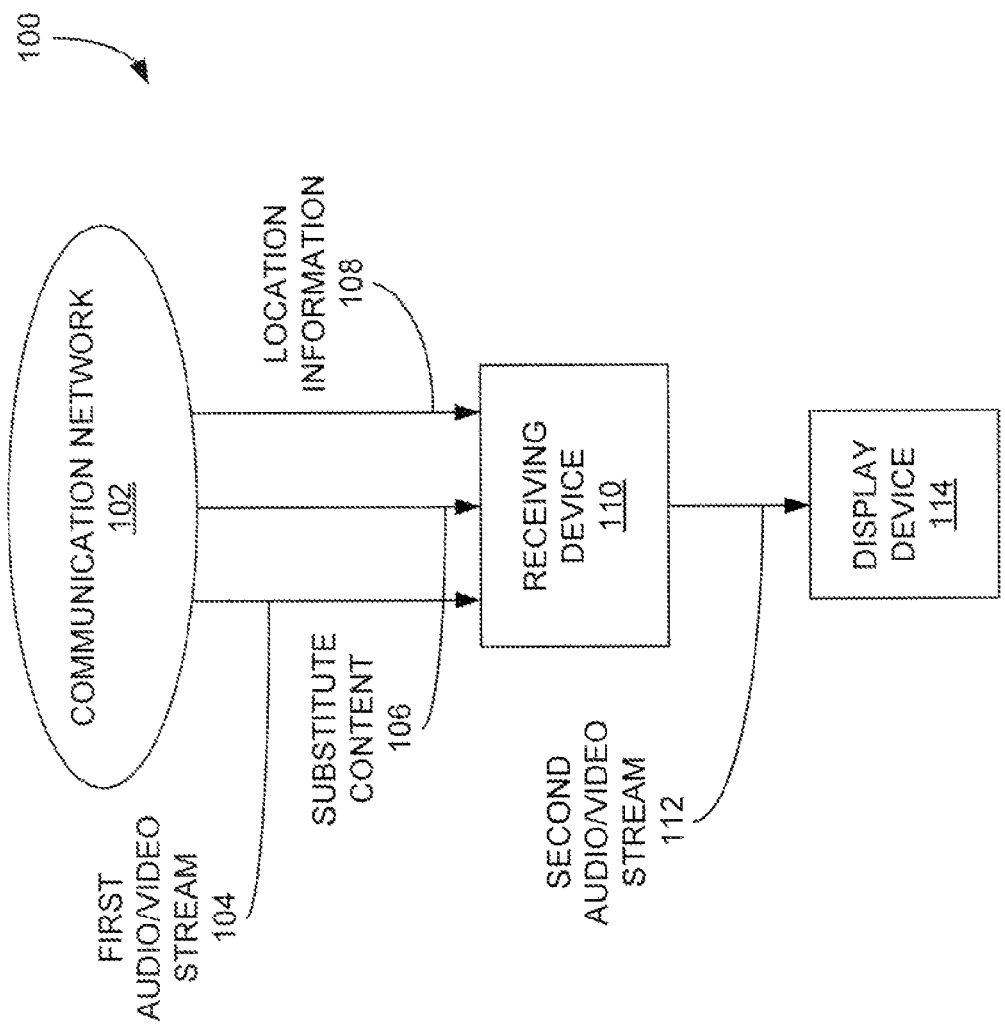
FIG. 1 illustrates an embodiment of a system for presenting content to a user.

The various embodiments described herein generally provide apparatus, systems and methods which facilitate the reception, processing, and outputting of audio/video content. More particularly, the various embodiments described herein provide for the identification of portions of an audio/video stream that are to be skipped during presentation of the audio/video stream. The various embodiments further provide for the insertion of substitute content into locations of the audio/video stream during presentation. In short, various embodiments described herein provide apparatus, systems and/or methods for replacing content in an audio/video stream based on data included in or associated with the audio/video stream.

In at least one embodiment, the audio/video stream to be received, processed, outputted and/or communicated may come in any form of an audio/video stream. Exemplary audio/video stream formats include Motion Picture Experts Group (MPEG) standards, Flash, Windows Media and the like. It is to be appreciated that the audio/video stream may be supplied by any source, such as an over-the-air broadcast, a satellite or cable television distribution system, a digital video disk (DVD) or other optical disk, the internet or other communication networks, and the like. In at least one embodiment, the audio/video data may be associated with supplemental data that includes text data, such as closed captioning data or subtitles. Particular portions of the closed captioning data may be associated with specified portions of the audio/video data.

In various embodiments described herein, the text data associated with an audio/video stream is processed to identify portions of the audio/video stream. More particularly, the text data may be processed to identify boundaries of portions of the audio/video stream. The portions of the audio/video stream between identified boundaries may then be designated for presentation to a user, or may be designated for skipping during presentation of the audio/video stream. Thus, in at least one embodiment, portions of an audio/video stream that a user desires to view may be presented to the user, and portions of the audio/video stream that a user desires not to view may be skipped during presentation of the audio/video stream. Further, substitute content may be identified for presentation in association with portions of the original audio/video stream. The substitute content may be inserted within any identified location of the audio/video stream. For example, the original commercials included in a recorded audio/video stream may be replaced with updated commercials during subsequent presentation of the recorded audio/video stream.

Generally, an audio/video stream is a contiguous block of associated audio and video data that may be transmitted to, and received by, an electronic device, such as a terrestrial ("over-the-air") television receiver, a cable television receiver, a satellite television receiver, an internet connected television or television receiver, a computer, a portable electronic device, or the like. In at least one embodiment, an audio/video stream may include a recording of a contiguous block of programming from a television channel (e.g., an episode of a television show). For example, a digital video recorder may record a single channel between 7:00 and 8:00, which may correspond with a single episode of a television program. Generally, an hour long recording includes approximately 42 minutes of video frames of the television program, and approximately 18 minutes of video frames of commercials and other content that is not part of the television program.

The television program may be comprised of multiple segments of video frames, which are interspersed with interstitials (e.g., commercials). As used herein, an interstitial is the video frames of a recording that do not belong to a selected show (e.g., commercials, promotions, alerts, and other shows). A segment of video includes contiguous video frames of the program that are between one or more interstitials.

Further, an audio/video stream may be delivered by any transmission method, such as broadcast, multicast, simulcast, closed circuit, pay-per-view, point-to-point (by "streaming," file transfer, or other means), or other methods. Additionally, the audio/video stream may be transmitted by way of any communication technology, such as by satellite, wire or optical cable, wireless, or other means. The audio/video stream may also be transferred over any type of communication network, such as the internet or other wide area network, a local area network, a private network, a mobile communication system, a terrestrial television network, a cable television network, and a satellite television network.

FIG. 1 illustrates an embodiment of a system 100 for presenting content to a user. The system of FIG. 1 is operable for replacing audio/video content within a contiguous block of audio/video data with substitute content for presentation to a user. The system 100 includes a communication network 102, a receiving device 110 and a display device 114. Each of these components is discussed in greater detail below.

The communication network 102 may be any communication network capable of transmitting an audio/video stream. Exemplary communication networks include television distribution networks (e.g., over-the-air, satellite and cable television networks), wireless communication networks, public switched telephone networks (PSTN), and local area networks (LAN) or wide area networks (WAN) providing data communication services. The communication network 102 may utilize any desired combination of wired (e.g., cable and fiber) and/or wireless (e.g., cellular, satellite, microwave, and radio frequency) communication mediums and any desired network topology (or topologies when multiple mediums are utilized).

The receiving device 110 of FIG. 1 may be any device capable of receiving an audio/video stream from the communication network 102. For example, in the case of the communication network 102 being a cable or satellite television network, the receiving device 110 may be a set-top box configured to communicate with the communication network 102. The receiving device 110 may be a digital video recorder in some embodiments. In another example, the receiving device 110 may be computer, a personal digital assistant (PDA), or similar device configured to communicate with the internet or comparable communication network 102. While the receiving device 110 is illustrated as receiving content via the communication network 102, in other embodiments, the receiving device may receive, capture and record video streams from non-broadcast services, such as video recorders, DVD players, personal computers or the internet.

The display device 114 may be any device configured to receive an audio/video stream from the receiving device 110 and present the audio/video stream to a user. Examples of the display device 114 include a television, a video monitor, or similar device capable of presenting audio and video information to a user. The receiving device 110 may be communicatively coupled to the display device 114 through any type of wired or wireless connection. Exemplary wired connections include coax, fiber, composite video and high-definition multimedia interface (HDMI). Exemplary wireless connections include WiFi, ultra-wide band (UWB) and Bluetooth. In some implementations, the display device 114 may be integrated within the receiving device 110. For example, each of a computer, a PDA, and a mobile communication device may serve as both the receiving device 110 and the display device 114 by providing the capability of receiving audio/video streams from the communication network 102 and presenting the received audio/video streams to a user. In another implementation, a cable-ready television may include a converter device for receiving audio/video streams from the communication network 102 and displaying the audio/video streams to a user.

In the system 100, the communication network 102 transmits each of a first audio/video stream 104, substitute content 106 and location information 108 to the receiving device 110. The first audio/video stream 104 includes audio data and video data. In one embodiment, the video data includes a series of digital frames, or single images to be presented in a serial fashion to a user. Similarly, the audio data may be composed of a series of audio samples to be presented simultaneously with the video data to the user. In one example, the audio data and the video data may be formatted according to one of the MPEG encoding standards, such as MPEG-2 or MPEG-4, as may be used in DBS systems, terrestrial Advanced Television Systems Committee (ATSC) systems or cable systems. However, different audio and video data formats may be utilized in other implementations.

Also associated with the first audio/video stream 104 is supplemental data providing information relevant to the audio data and/or the video data of the first audio/video stream 104. In one implementation, the supplemental data includes text data, such as closed captioning data, available for visual presentation to a user during the presentation of the associated audio and video data of the audio/video data stream 104. In some embodiments, the text data may be embedded within the audio/video stream during transmission across the communication network 102 to the receiving device 110. In one example, the text data may conform to any text data or closed captioning standard, such as the Electronic Industries Alliance 708 (EIA-708) standard employed in ATSC transmissions or the EIA-608 standard. When the text data is available to the display device 114, the user may configure the display device 114 to present the text data to the user in conjunction with the video data.

Each of a number of portions of the text data may be associated with a corresponding portion of the audio data or video data also included in the audio/video stream 104. For example, one or more frames of the video data of the audio/video stream 104 may be specifically identified with a segment of the text data included in the first audio/video stream 104. A segment of text data (e.g., a string of bytes) may include displayable text strings as well as non-displayable data strings (e.g., codes utilized for positioning the text data). As a result, multiple temporal locations within the audio/video stream 104 may be identified by way of an associated portion of the text data. For example, a particular text string or phrase within the text data may be associated with one or more specific frames of the video data within the first audio/video stream 104 so that the text string is presented to the user simultaneously with its associated video data frames. Therefore, the particular text string or phrase may provide an indication of a location of these video frames, as well as the portion of the audio data synchronized or associated with the frames.

The communication network 102 also transmits substitute content 106 and location information 108 to the receiving device 110. The substitute content 106 and/or the location information 108 may be transmitted to the receiving device 110 together or separately. Further, the substitute content 106 and/or the location information 108 may be transmitted to the receiving device 110 together or separately from the first audio/video stream 104. Generally, the substitute content 106 is provided to replace or supplant a portion of the first audio/video stream 104. The location information 108 specifies locations within the first audio/video stream 104 that are to be skipped and/or presented during presentation of the audio/video data of the first audio/video stream 104 by the receiving device 110. For example, if the first audio/video stream 104 includes one or more segments of a television show interspersed with one or more interstitials, then the location information 108 may identify the locations of the segments, which are to be presented, and/or identify the locations of the interstitial, which are to be skipped.

The location information 108 may identify the boundaries of either the segments or the interstitials. More particularly, the location information 108 may reference the text data to identify a video location within the first audio/video stream 104. The video location may then be utilized to determine the boundaries of either the segments or the interstitials. Generally, the beginning boundary of a segment corresponds with the ending boundary of an interstitial. Similarly, the ending boundary of a segment corresponds with the beginning boundary of an interstitial. Thus, the receiving device 110 may utilize the boundaries of segments to identify the boundaries of the interstitials, and vice versa. In some embodiments, the first audio/video stream 104 may not include both segments and interstitials, but nonetheless may include portions of audio/video data that a user desires to skip during presentation of the audio/video content of the first audio/video stream 104. Thus, the location information 108 may identify which portions of the audio/video content of the first audio/video stream are to be presented and/or skipped during presentation to a user.

In at least one embodiment, the insertion location of the substitute content 106 may be designated by the location information 108. For example, the substitute content 106 may be designated to replace an interstitial of the first audio/video stream 104. However, other locations for the substitute content 106 may also be identified by either the location information 108 or by the receiving device 110. For example, the substitute content 106 may be presented before the beginning of audio/video data of the first audio/video stream 104.

The receiving device 110 is operable for processing the text data to identify the portions of the audio/video stream which are to be presented to a user. More particularly, the receiving device 110 operates to identify the segments of the audio/video stream 104 which are to be presented to a user. The receiving device 110 further identifies substitute content 106 to present in association with the identified segments of the first audio/video stream 104. The receiving device 110 outputs a second audio/video stream 112, including the segments of the first audio/video stream 104 and the substitute content 106, for presentation on the display device 114. Thus, in some embodiments, the receiving device 110 operates to filter the interstitials from the first audio/video stream 104 and replaces the interstitials with the substitute content when outputting the second audio/video stream 112.

Figure 2:
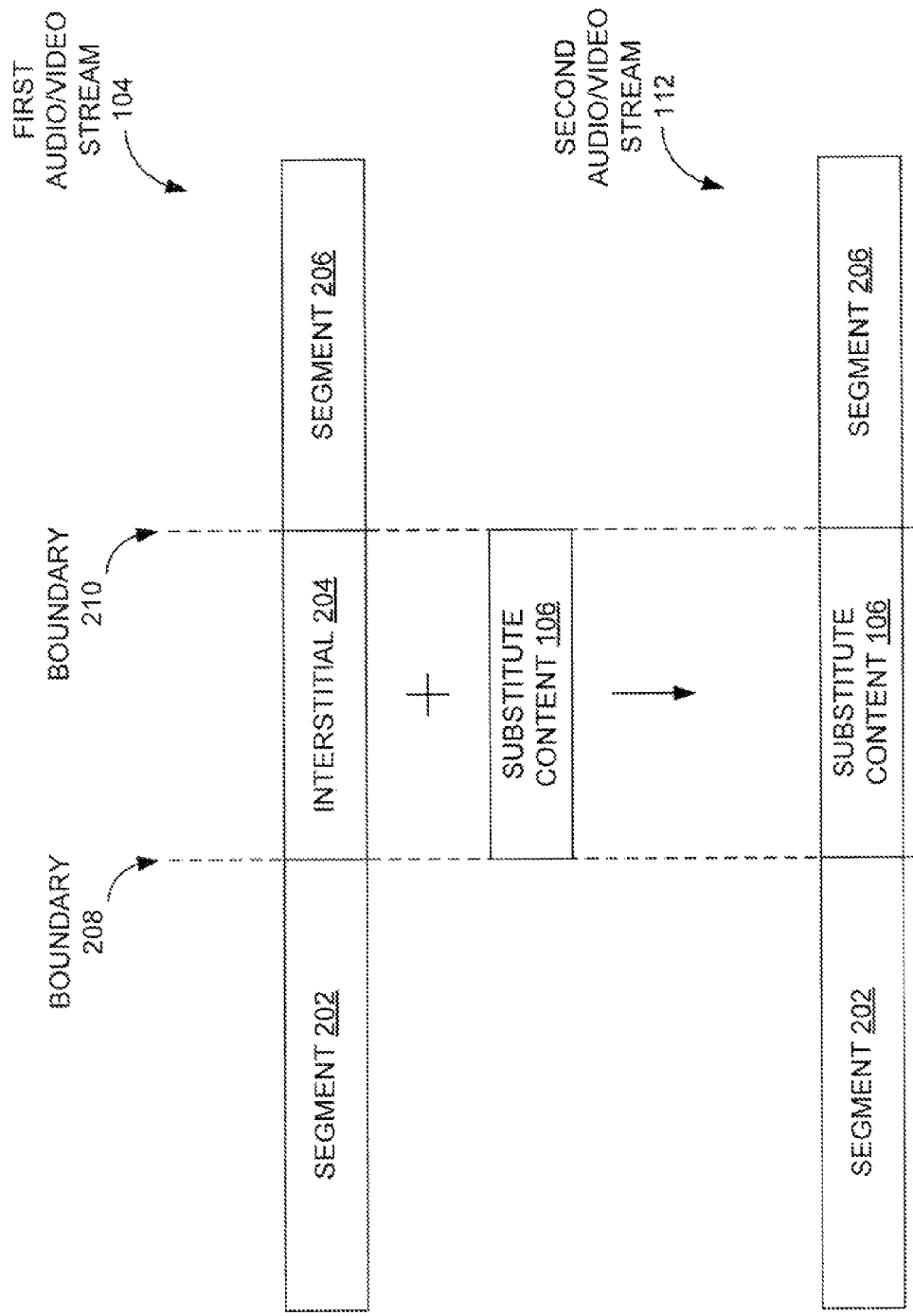
FIG. 2 illustrates an embodiment of a graphical representation of a first audio/video stream received by the receiving device, and a second audio/video stream outputted by the receiving device.

FIG. 2 illustrates an embodiment of a graphical representation of the first audio/video stream 104 received by the receiving device 110, and a second audio/video stream 112 outputted by the receiving device 110. More particularly, FIG. 2 illustrates an embodiment in which an interstitial of the first audio/video stream 104 is replaced by the substitute content 106 during presentation of the second audio/video stream 112. FIG. 2 will be discussed in reference to the system 100 of FIG. 1.

The first audio/video stream 104 includes a first audio/video segment 202 of a show, an interstitial 204 and a second audio/video segment 206 of the show. Also indicated are beginning and ending boundaries 208 and 210 of the interstitial 204, which are indicated to the receiving device 110 (see FIG. 1) by way of the location information 108. It is to be recognized that the boundaries 208 and 210 of the interstitial 204 are also boundaries of the segments 202 and 206. The supplemental data of the audio/video stream 104 is not shown in FIG. 2 to simplify the diagram.

In the specific example of FIG. 2 the boundary 208 (e.g., the ending boundary of segment 202) is the starting point at which the substitute content 106 is to replace a portion of the first audio/video stream 104. Likewise, the boundary 210 (e.g., the beginning boundary of segment 206) is the ending point at which the substitute content 106 is to replace a portion of the first audio/video stream 104. In FIG. 2, the portion of the first audio/video stream 104 to be replaced is the interstitial 204, located between the segments 202 and 206. As a result of this replacement, a second audio/video stream 112 is produced, in which the substitute content 106 is presented in place of the interstitial 204 during presentation of the second audio/video stream 112.

Figure 3:
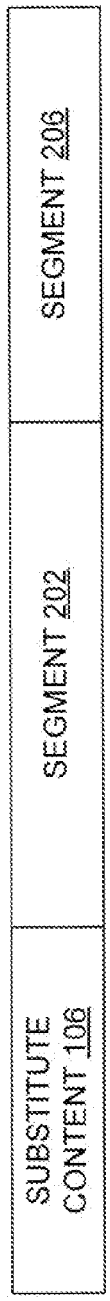
FIG. 3 illustrates an embodiment of a second audio/video stream in which the substitute content is presented before the segments of a show.

While FIG. 2 illustrates the substitute content 106 replacing the interstitial 204, it is to be appreciated that other locations of the substitute content 106 may also be utilized. FIG. 3 illustrates an embodiment of a second audio/video stream 112B in which the substitute content 106 is presented before the segments 202 and 206. Thus, the second audio/video stream 112B includes the substitute content 106 followed by the segment 202 and the segment 206. The interstitial 204 (see FIG. 2) is thus skipped during presentation of the second audio/video stream 112B.

Figure 4:
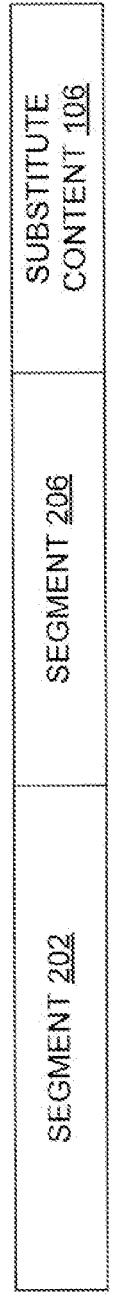
FIG. 4 illustrates an embodiment of a second audio/video stream in which the substitute content is presented after the segments of a show.

FIG. 4 illustrates an embodiment of a second audio/video stream 112C in which the substitute content 106 is presented after the segments 202 and 206. The second audio/video stream 112C includes the segment 202 followed by the segment 206 which is followed by the substitute content 106. Again, the interstitial 204 (see FIG. 2) is skipped during presentation of the second audio/video stream 112C. The substitute content 106 may be inserted at any logical location within the second audio/video stream 112B.

Returning to FIGS. 1 and 2, while the substitute content 106 is illustrated as having the same length as the interstitial 204, it is to be appreciated that the substitute content 106 may have a duration that is the same as, or different than the original content it replaces (e.g., interstitial 204). For example, the length of substitute commercials utilized during playback of the recording may be selected to maintain the original length of the recording. In another embodiment, the length of the substitute content 106 utilized may be significantly shorter or longer than the commercials or other content it replaces. For example, an interstitial may originally include four commercials totaling two minutes in length, and these four commercials may be replaced with a single commercial that is thirty seconds in length. In at least one embodiment, the receiving device 110 may restrict the user from utilizing trick mode functions (e.g., fast forwarding) in order to skip over the substitute content.

The substitute content 106 may be shown to the user to offset the costs associated with removing the original interstitials 204. Thus, by watching a substitute commercial, the user is able to avoid watching an additional 1.5 minutes of commercials that were originally in the show. In at least one embodiment, the substitute content 106 may also be selected to replace a commercial with a timelier commercial from the same advertiser. For example, a department store may have originally advertised a sale during the original broadcast of the show, but that particular sale may have since ended. Thus, the substitute content 106 may replace that particular commercial with another commercial advertising a current sale at the store.

In at least one embodiment, the substitute content may be selected based on characteristics or demographics of the user. For example, if the user is a small child, then a commercial for a toy may be selected, whereas if the viewer is an adult male, then a commercial for a sports car may be shown. In some embodiments, the characteristics utilized may be viewing characteristics of the user. Thus, the receiving device 110 may track what the user watches, and the substitute content 106 may be selected based on the collected data. For example, if the user watches many detective shows, then the substitute content may be a preview for a new detective show on Friday nights, whereas, if the user watches many reality shows, then the substitute content may be a preview for the new season of a reality show on Thursday nights.

As described above, the receiving device 110 (see FIG. 1) may identify the boundaries 208 and 210 (see FIG. 2) of the first audio/video stream 104 by processing the text data associated with the first audio/video stream 104. The boundaries 208 and 210 are identified based on the location of one or more video locations within the first audio/video stream 104. More particularly, the beginning and ending boundaries of a segment of the first audio/video stream 104 may be specified by a single video location within the segment. Thus, each segment may be identified by a unique video location within the first audio/video stream 104.

To specify a video location within the first audio/video stream 104, the location information 108 references a portion of the text data associated with the first audio/video stream 104. A video location within the first audio/video stream 104 may be identified by a substantially unique text string within the text data that may be unambiguously detected by the receiving device 110. The text data may consist of a single character, several characters, an entire word, multiple consecutive words, or the like. Thus, the receiving device 110 may review the text data to identify the location of the unique text string. Because the text string in the text data is associated with a particular location within the first audio/video stream 104, the location of the text string may be referenced to locate the video location within the first audio/video location.

In some embodiments, multiple video locations may be utilized to specify the beginning and ending boundaries of a segment. In at least one embodiment, a single video location is utilized to identify the beginning and ending boundaries of a segment. The video location may be located at any point within the segment, and offsets may be utilized to specify the beginning and ending boundaries of the segment relative to the video location. In one implementation, a human operator, of a content provider of the first audio/video stream 104, bears responsibility for selecting the text string, the video location and/or the offsets. In other examples, the text string, video location and offset selection occurs automatically under computer control, or by way of human-computer interaction. A node within the communication network 102 may then transmit the selected text string to the receiving device 110 as the location information 108, along with the forward and backward offset data.

Figure 5:
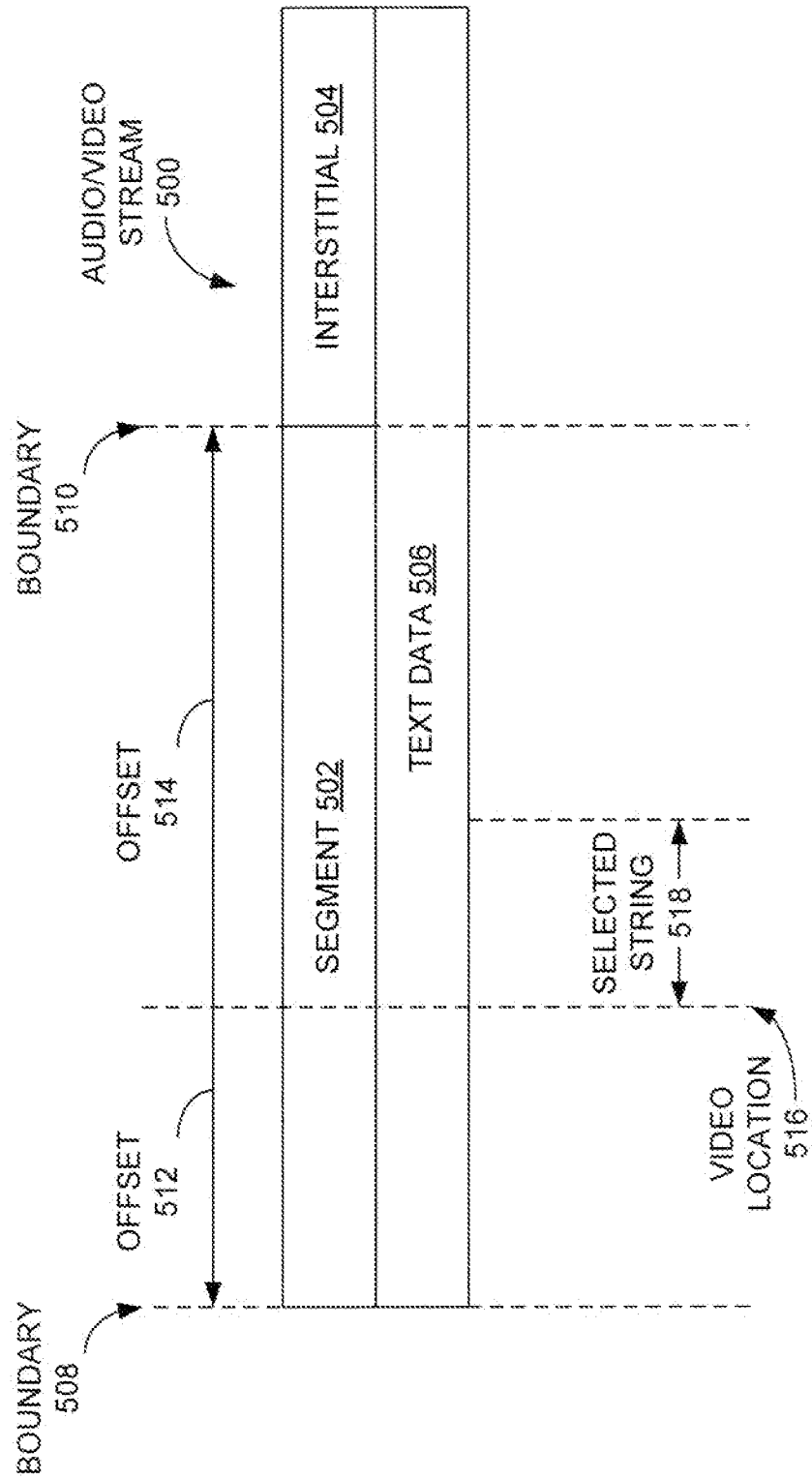
FIG. 5 illustrates an embodiment in which the boundaries of a segment of an audio/video stream are identified based on a text string included with the text data associated with the audio/video stream.

FIG. 5 illustrates an embodiment in which the boundaries of a segment of an audio/video stream 500 are identified based on a text string included with the text data associated with the audio/video stream 500. FIG. 5 will be discussed in reference to system 100 of FIG. 1. The audio/video stream 500 includes a segment 502, an interstitial 504 and text data 506. The segment 502 is defined by a boundary 508 and a boundary 510. The location information 108 received by the receiving device 110 identifies the segment 502 using a selected string 518 and offsets 512 and 514. Each of these components is discussed in greater detail below.

The receiving device 110 reviews the text data 506 to locate the selected string 518. As illustrated in FIG. 5, the selected string 518 is located at the video location 516. More particularly, in at least one embodiment, the beginning of the selected string 518 corresponds with the frame located at the video location 516. After locating the video location 516, the receiving device 110 utilizes the negative offset 512 to identify the beginning boundary 508. Likewise, the receiving device 110 utilizes the positive offset 514 to identify the ending boundaries 510. The offsets 512 and 514 are specified relative to the video location 516 to provide independence from the absolute presentation times of the video frames associated with the boundaries 508 and 510 within the audio/video stream 500. For example, two users may begin recording a particular program from two different affiliates (e.g., one channel in New York City and another channel in Atlanta). Thus, the absolute presentation time of the boundaries 508 and 510 will vary within the recordings. The technique described herein locates the same video frames associated with the boundaries 508 and 510 regardless of their absolute presentation times within a recording.

In at least one embodiment, the receiving device 110 filters the content of the audio/video stream 500 by outputting the video content of segment 502, while omitting from the presentation the interstitial 504 located outside of the boundaries 508 and 510. The receiving device 110 may additionally present the substitute content 106 adjacent to either of the boundaries 508 and 510. In some embodiments, the receiving device 110 may output the video content within the boundaries 508 and 510 and may also present video content within another set of similar boundaries 508 and 510, thus omitting presentation of the interstitial 504.

In at least one embodiment, a receiving device 110 identifies a set of boundaries 508 and 510 for a portion of the audio/video stream 500, and omits presentation of the content within the boundaries while presenting the other video content that is outside of the boundaries 508 and 510. For example, a user may watch the commercials within a football game, while skipping over the actual video content of the football game.

Depending on the resiliency and other characteristics of the text data, the node of the communication network 102 generating and transmitting the location information 108 may issue more than one instance of the location information 108 to the receiving device 110. For example, text data, such as closed captioning data, is often error-prone due to transmission errors and the like. As a result, the receiving device 110 may not be able to detect some of the text data, including the text data selected for specifying the video location 516. To address this issue, multiple unique text strings may be selected from the text data 506 of the audio/video stream 500 to indicate multiple video locations (e.g., multiple video locations 516), each having a different location in the audio/video stream 500. Each string has differing offsets relative to the associated video location that point to the same boundaries 508 and 510. The use of multiple text strings (each accompanied with its own offset(s)) may thus result in multiple sets of location information 108 transmitted over the communication network 102 to the receiving device 110, each of which is associated with the segment 502. Each set of location information 108 may be issued separately, or may be transmitted in one more other sets.

The location information 108 and the substitute content 106 may be logically associated with one another to prevent incorrect association of the location information 108 with other substitute content 106 being received at the receiving device 110. To this end, the substitute content 106 may include an identifier or other indication associating the substitute content 106 with its appropriate location information 108. Conversely, the location information 108 may include such an identifier, or both the substitute content 106 and the location information 108 may do so. Use of an identifier may be appropriate if the substitute content 106 and the location information 108 are transmitted separately, such as in separate data files. In another embodiment, the substitute content 106 and the location information 108 may be packaged within the same transmission to the receiving device 110 so that the receiving device 110 may identify the location information 108 with the substitute content 106 on that basis.

Further, both the substitute content 106 and the location information 108 may be associated with the first audio/video stream 104 to prevent any incorrect association of the data with another audio/video stream. Thus, an identifier, such as that discussed above, may be included with the first audio/video stream 104 to relate the audio/video stream 104 to its substitute content 106 and location information 108. In one particular example, the identifier may be a unique program identifier (UPID). Each show may be identified by a UPID. A recording (e.g., one file recorded by a receiving device between 7:00 and 8:00) may include multiple UPIDs. For example, if a television program doesn't start exactly at the hour, then the digital video recorder may capture a portion of a program having a different UPID. The UPID allows a digital video recorder to associate a particular show with its corresponding location information 108 and/or substitute content 106.

Use of an identifier in this context addresses situations in which the substitute content 106 and the location information 108 are transmitted after the first audio/video stream 104 has been transmitted over the communication network 102 to the receiving device 110. In another scenario, the substitute content 106 and the location information 108 may be available for transmission before the time the first audio/video stream 104 is transmitted. In this case, the communication network 102 may transmit the substitute content 106 and the location information 108 before the first audio/video stream 104.

Figure 6:
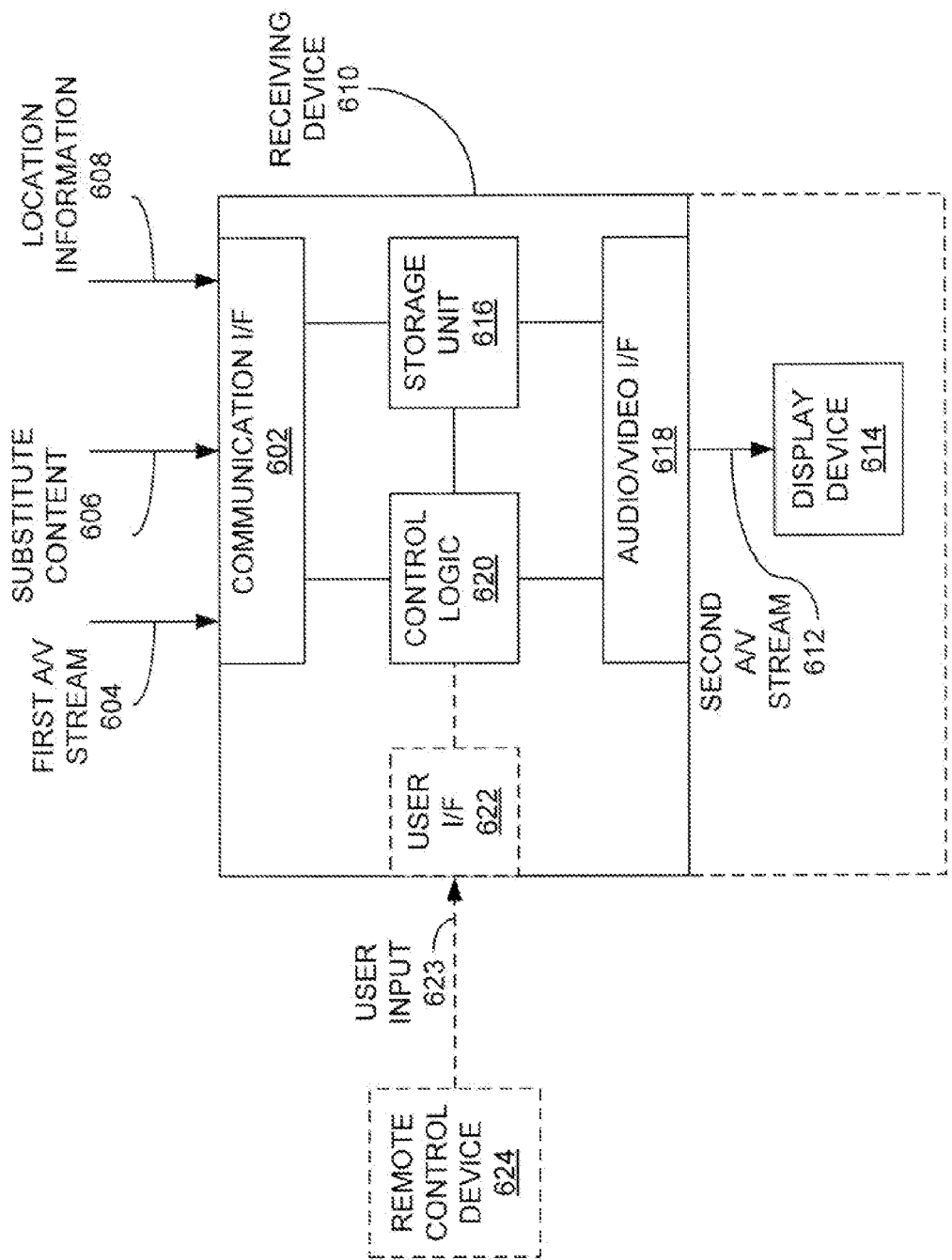
FIG. 6 illustrates an embodiment of a receiving device for presenting a recorded audio/video stream.

A more explicit view of a receiving device 610 according to one embodiment is illustrated in FIG. 6. The receiving device 610 includes a communication interface 602, a storage unit 616, an audio/video interface 618 and control logic 620. In some implementations, a user interface 622 may also be employed in the receiving device 610. Other components possibly included in the receiving device 610, such as demodulation circuitry, decoding logic, and the like, are not shown explicitly in FIG. 6 to facilitate brevity of the discussion.

The communication interface 602 may include circuitry to receive a first audio/video stream 604, substitute content 606 and location information 608. For example, if the receiving device 610 is a satellite set-top box, the communication interface 602 may be configured to receive satellite programming, such as the first audio/video stream 604, via an antenna from a satellite transponder. If, instead, the receiving device 610 is a cable set-top box, the communication interface 602 may be operable to receive cable television signals and the like over a coaxial cable. In either case, the communication interface 602 may receive the substitute content 606 and the location information 608 by employing the same technology used to receive the first audio/video stream 604. In another implementation, the communication interface 602 may receive the substitute content 606 and the location information 608 by way of another communication technology, such as the internet, a standard telephone network, or other means. Thus, the communication interface 602 may employ one or more different communication technologies, including wired and wireless communication technologies, to communicate with a communication network, such as the communication network 102 of FIG. 1.

Coupled to the communication interface 602 is a storage unit 616, which is configured to store both the first audio/video stream 604 and the substitute content 606. The storage unit 616 may include any storage component configured to store one or more such audio/video streams. Examples include, but are not limited to, a hard disk drive, an optical disk drive, and flash semiconductor memory. Further, the storage unit 616 may include either or both volatile and non-volatile memory.

Communicatively coupled with the storage unit 616 is an audio/video interface 618, which is configured to output audio/video streams from the receiving device 610 to a display device 614 for presentation to a user. The audio/video interface 618 may incorporate circuitry to output the audio/video streams in any format recognizable by the display device 614, including composite video, component video, the Digital Visual Interface (DVI), the High-Definition Multimedia Interface (HDMI), Digital Living Network Alliance (DLNA), Ethernet, Multimedia over Coax Alliance (MOCA), WiFi and IEEE 1394. Data may be compressed and/or transcoded for output to the display device 614. The audio/video interface 618 may also incorporate circuitry to support multiple types of these or other audio/video formats. In one example, the display device 614, such as a television monitor or similar display component, may be incorporated within the receiving device 610, as indicated earlier.

In communication with the communication interface 602, the storage unit 616, and the audio/video interface 618 is control logic 620 configured to control the operation of each of these three components 602, 616, 618. In one implementation, the control logic 620 includes a processor, such as a microprocessor, microcontroller, digital signal processor (DSP), or the like for execution of software configured to perform the various control functions described herein. In another embodiment, the control logic 620 may include hardware logic circuitry in lieu of, or in addition to, a processor and related software to allow the control logic 620 to control the other components of the receiving device 610.

Optionally, the control logic 620 may communicate with a user interface 622 configured to receive user input 623 directing the operation of the receiving device 610. The user input 623 may be generated by way of a remote control device 624, which may transmit the user input 623 to the user interface 622 by the use of, for example, infrared (IR) or radio frequency (RF) signals. In another embodiment, the user input 623 may be received more directly by the user interface 622 by way of a touchpad or other manual interface incorporated into the receiving device 610.

The receiving device 610, by way of the control logic 620, is configured to receive the first audio/video stream 604 by way of the communication interface 602, and store the audio/video stream 604 in the storage unit 616. The receiving device 610 is also configured to receive the substitute content 606 over the communication interface 602, possibly storing the substitute content 606 in the storage unit 616 as well. The location information 608 is also received at the communication interface 602, which may pass the location information 608 to the control logic 620 for processing. In another embodiment, the location information 608 may be stored in the storage unit 616 for subsequent retrieval and processing by the control logic 620.

At some point after the location information 608 is processed, the control logic 620 generates and transmits a second audio/video stream 612 over the audio/video interface 618 to the display device 614. In one embodiment, the control logic 620 generates and transmits the second audio/video stream 612 in response to the user input 623. For example, the user input 623 may command the receiving device 610 to output the first audio/video stream 604 to the display device 614 for presentation. In response, the control logic 620 instead generates and outputs the second audio/video stream 612. As described above in reference to FIG. 1, the second audio/video stream 612 includes portions of the audio/video data of the first audio/video stream 604, with the substitute content 606 also being presented in association with the portions of the first audio/video stream 604. In some embodiments, the substitute content 606 may replace portions of the original audio/video content of the first audio/video stream 604 at a location specified in the location information 608, as described in detail above with respect to the first audio/video stream 104 of FIG. 1. For example, the first audio/video stream 604 may include portions of a movie that are not appropriate for viewing by children. The substitute content 606 may be utilized to replace these portions of the first audio/video stream 604 with more appropriate portions of video content for output in the second audio/video stream 612. In other embodiments, the substitute content 606 may be utilized to augment portions of the first audio/video stream 604 which are presented as part of the second audio/video stream 612.

Depending on the implementation, the second audio/video stream 612 may or may not be stored as a separate data structure in the storage unit 616. In one example, the control logic 620 generates and stores the entire second audio/video stream 612 in the storage unit 616. The control logic 620 may further overwrite the first audio/Video stream 604 with the second audio/video stream 612 to save storage space within the storage unit 616. Otherwise, both the first audio/video stream 604 and the second audio/video stream 612 may reside within the storage unit 616.

In another implementation, the second audio/video stream 612 may not be stored separately within the storage unit 616. For example, the control logic 620 may instead generate the second audio/video stream 612 "on the fly" by transferring selected portions of the audio data and the video data of the first audio/video stream 604 in presentation order from the storage unit 616 to the audio/video interface 618. At the point at which the substitute content 606 indicated by the location information 608 is to be outputted, the control logic 620 may then cause the substitute content 606 to be transmitted from the storage unit 616 to the audio/video interface 618 for output to the display device 614. Once the last of the substitute content 606 has been transferred from the storage unit 616, the control logic 620 may cause remaining portions of the first audio/video stream 604 which are to be presented to a user to be outputted to the audio/video interface 618 for presentation to the display device 614.

In one implementation, a user may select by way of the user input 623 whether the first audio/video stream 604 or the second audio/video stream 612 is outputted to the display device 614 by way of the audio/video interface 618. In another embodiment, a content provider of the first audio/video stream 604 may prevent the user from maintaining such control by way of additional information delivered to the receiving device 610.

If more than one portion of substitute content 606 is available in the storage unit 616 to replace a specified portion of the audio/video of the first audio/video stream 604 or augment the first audio/video stream 604, then the user may select via the user input 623 which of the substitute content 606 are to replace the corresponding portion of the audio data of the first audio/video stream 604 upon transmission to the display device 614. Such a selection may be made in a menu system incorporated in the user interface 622 and presented to the user via the display device 614. In other embodiments, the control logic 620 may select the substitute content 606 based on various criteria, such as information specified in the location information 608, user characteristics such a demographic information or user viewing characteristics.

Figure 7:
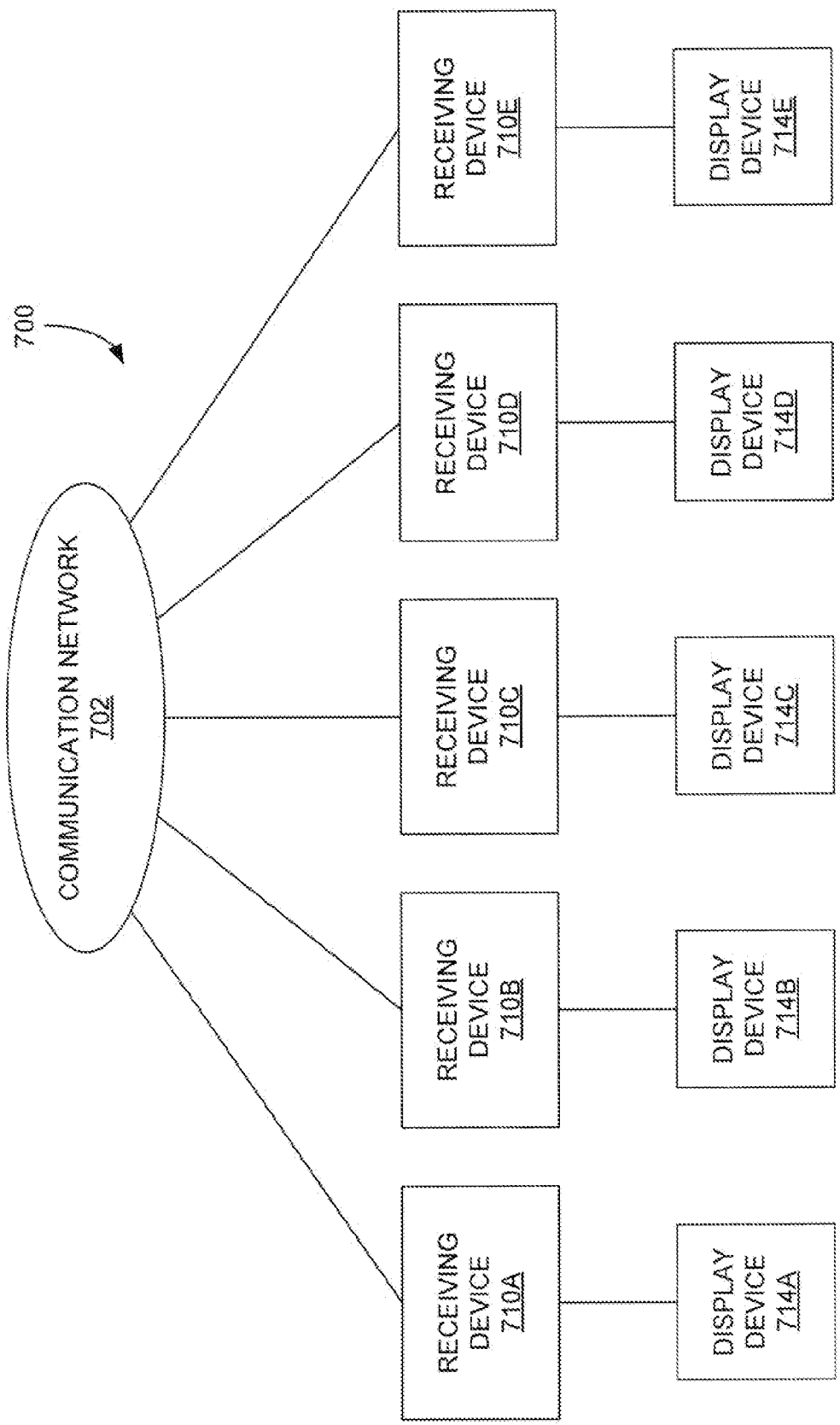
FIG. 7 illustrates an embodiment of a system in which multiple receiving devices are communicatively coupled to a communication network.

In a broadcast environment, such as that depicted in the system 700 of FIG. 7, multiple receiving devices 710A-E may be coupled to a communication network 702 to receive audio/video streams, any of which may be recorded, in whole or in part, by any of the receiving devices 710A-E. In conjunction with any number of these audio/video streams, substitute content serving to replace content in an audio/video stream or to augment content in an audio/video stream, as well as the location information for portions of the audio/video stream which are to be skipped and/or presented to a user, may be transferred to the multiple receiving devices 710A-E. In response to receiving the audio/video streams, each of the receiving devices 710A-E may record any number of the audio/video streams received. For any substitute content and associated location information that are transmitted over the communication network 702, each receiving device 710A-E may then review whether the received audio/video data segments and location information are associated with an audio/video stream currently stored in the device 710A-E. If the associated stream is not stored therein, the receiving device 710A-E may delete or ignore the related audio data segment and location information received.

In another embodiment, instead of broadcasting each possible substitute content and related location information, the transfer of an audio/video stream stored within the receiving device 710A-E to an associated display device 714A-E may cause the receiving device 710A-E to query the communication network 702 for any outstanding substitute content that apply to the stream to be presented. For example, the communication network 702 may comprise an internet connection. As a result, the broadcasting of each portion of substitute content and related location information would not be required, thus potentially reducing the amount of consumed bandwidth over the communication network 702.

Figure 8:
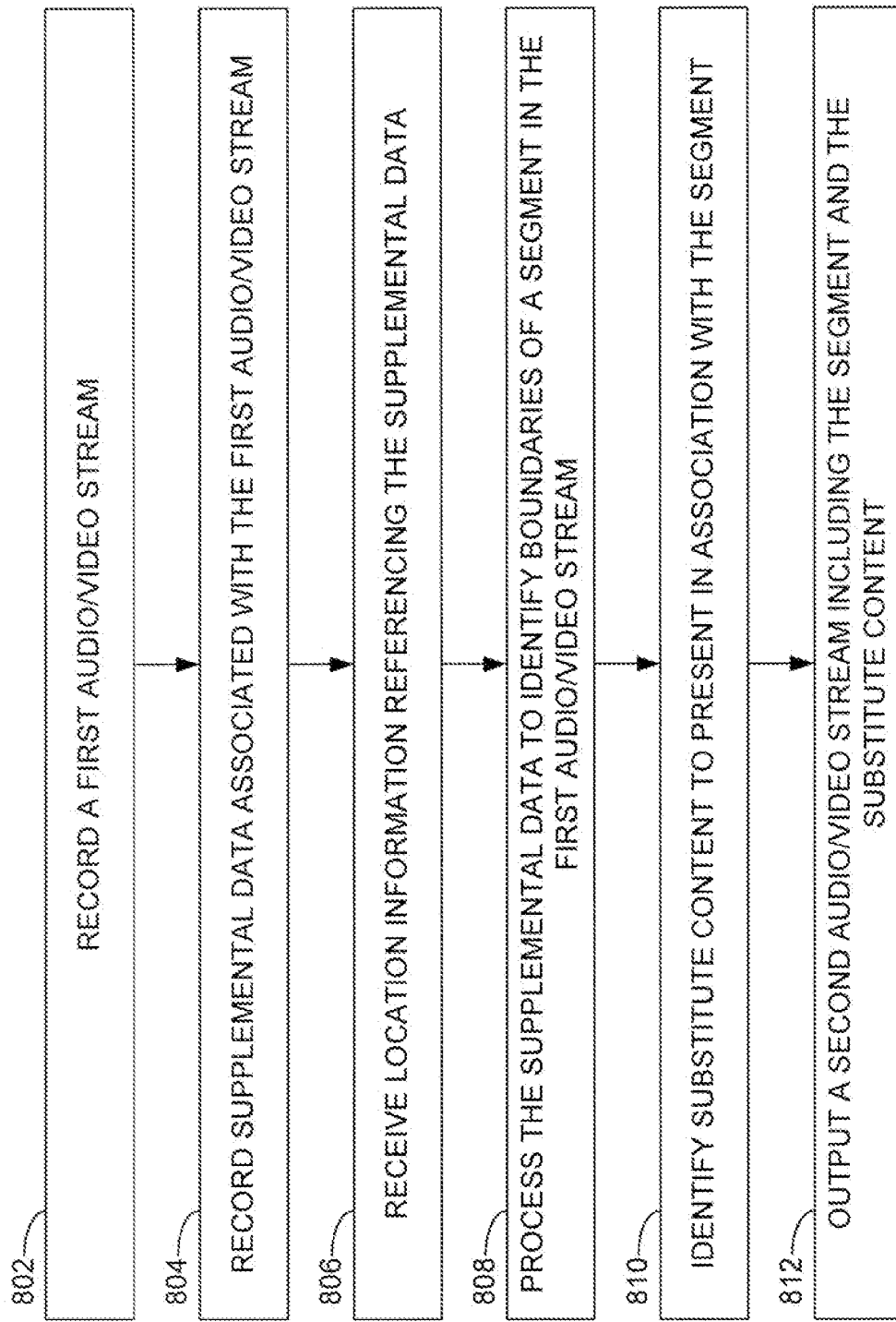
FIG. 8 illustrates an embodiment of a process for presenting a recorded audio/video stream.

FIG. 8 illustrates an embodiment of a process for presenting a recorded audio/video stream. The operation of FIG. 8 is discussed in reference to filtering a broadcast television program. However, it is to be appreciated that the operation of the process of FIG. 8 may be applied to filter other types of video stream content. The operations of the process of FIG. 8 are not all-inclusive, and may comprise other operations not illustrated for the sake of brevity.

The process includes recording a first audio/video stream including at least one segment of a show and at least one interstitial of the show (operation 802). The process further includes recording supplemental data associated with the first audio/video stream (operation 804). The supplemental data includes closed captioning data associated with the first audio/video stream. Closed captioning data is typically transmitted in two or four byte intervals associated with particular video frames. Because video frames don't always arrive in their presentation order, the closed captioning data may be sorted according to the presentation order (e.g., by a presentation time stamp) of the closed captioning data. In at least one embodiment, the sorted closed captioning data may then be stored in a data file separate from the first audio/video stream.

The process further includes receiving location information associated with the first audio/video stream (operation 806). The location information references the closed captioning data to identify a video location within the first audio/video stream. The location information may be utilized to filter portions of an audio/video stream, and may be further utilized to insert substitute content to locations within the audio/video stream. Operations 802 and 806 may be performed in parallel, sequentially or in either order. For example, the location information may be received prior to recording the audio/video stream, subsequently to recording the audio/video stream, or at the same time as the audio/video stream. In at least one embodiment, the location information is received separately from the first audio/video stream.

As described above, closed captioning data may be sorted into a presentation order and stored in a separate data file. In at least one embodiment, the sorting process is performed responsive to receiving the location information in step 806. Thus, a digital video recorder may not perform the sorting process on the closed captioning data unless the location information used to filter the audio/video stream is available for processing. In other embodiments, the closed captioning data may be sorted and stored before the location information arrives at the digital video recorder. For example, the sorting process may be performed in real-time during recording.

The process further includes processing the closed captioning data to identify boundaries of a segment of the first audio/video stream based on the video location (operation 808). More particularly, a text string included within the closed captioning data may be utilized to identify a specific location within the audio/video stream (e.g., a video location). The text string may be a printable portion of the text data or may comprise formatting or display options, such as text placement information, text coloring information and the like. The audio/video contained within the boundaries may then either be designated for presentation or may be skipped when the digital video recorder outputs portions of the first audio/video stream to a display device. It is to be appreciated that operation 808 may identify either the boundaries of the segments of the interstitials or the segments of the show to filter the interstitials (or other portions of the first audio/video stream) from the audio/video stream.

Operation 808 may be performed to identify and skip portions of an audio/video stream for a variety of reasons. For example, a user may desire to skip commercials, portions of a television program or other content which is of no interest to the user, or portions of the audio/video stream which are offensive or should otherwise not be shown to certain users. The video location identified by a text string may be located within a portion of the audio/video stream that is designated for presentation (e.g., part of a television program), or may be within a portion of the audio/video stream that is designated for skipping (e.g., in a portion of the program that a user does not desire to view).

The process further includes identifying substitute content to present during presentation of the audio/video stream in association with the segments of the show (operation 810). The process further includes outputting a second audio/video stream for presentation on a presentation device (operation 812). The second audio/video stream includes at least one segment of the show and the substitute content. Thus, a user does not see the original interstitials of the show, but rather, may see the original segments of the show interspersed with substitute content. The substitute content may be presented during playback in any logical location of the audio/video stream.

For example, the substitute content may include a lead-in ad presented before the first segment of the show. In at least one embodiment, the segments of the show may then be presented back-to-back with no additional substitute content or interstitials presented there between. Thus, for the option of automatically filtering interstitials from within the show, the user may be presented with one or more lead-in ads, which may be specifically targeted to the user. This is advantageous to a user, because they receive automatic filtering of interstitials within the show. Likewise, advertisers and/or broadcasters benefit, because this ensures that a user will see at least some form of advertisement during playback of the recording. Otherwise, a viewer could manually fast forward through all advertising, and the broadcaster and/or advertiser lose all benefit to the advertising slots within the program.

In some embodiments, the substitute content is presented at the original interstitial locations within the first audio/video stream. For example, a digital video recorder may present video frames between beginning and ending boundaries of a segment of the show. The substitute content may then be presented after a video frame of the segment that is associated with the ending boundary. In at least one embodiment, only some of the original interstitials are replaced with substitute content. Thus, other interstitials may be filtered from the original recording during playback, or even presented to the user during playback.

Thus, through the process illustrated in FIG. 8, broadcasters, advertisers and content providers (e.g., satellite television providers and cable providers) may offer various combinations of advertisement viewing during playback of recorded content. Advertisers can offer timelier and more relevant advertising to users that the users are more likely to view. Additionally, broadcasters and service providers may offer services which allow users to skip over some commercials within a recording, as long as the users are willing to watch some replacement commercials as well. This offers a compromise between the interests of broadcasters to reap the economic benefits of their television programs, while allowing users the advantages offered by time shifting devices.

Under another scenario, some programs may contain content that some users deem offensive or objectionable. To render the program palatable to a wider range of viewers, the content provider may make alternative content segments of the program available to viewers. A user who has recorded the program may then select a milder form of the audio/video content portion for viewing.

In each of these examples, the replacement audio/video content may be made available to the receiving device after the audio/video stream has been recorded at the device, thus providing a significant level of flexibility as to when the replacement audio data is provided.

Although specific embodiments were described herein, the scope of the invention is not limited to those specific embodiments. The scope of the invention is defined by the following claims and any equivalents therein.

What is claimed is:

1. A method for processing a first audio/video stream having at least one segment of a show, at least one interstitial of the show, and closed captioning data associated with the show, the method comprising:

receiving autonomous location information separately from the first audio/video stream, the autonomous location information comprising a first unique text string, a second unique text string, a first forward offset associated with the first unique text string, a first backward offset associated with the first unique text string, a second forward offset associated with the second unique text string, and a second backward offset associated with the second unique text string;

processing the closed captioning data to identify the first unique text string; determining that the first unique text string is not located within the closed captioning data;

in response to determining that the first unique text string is not located within the closed captioning data, processing the closed captioning data again to identify the second unique text string;

determining that the second unique text string is located within the closed captioning data; and in response to determining that the second unique text string is located within the closed captioning data, utilizing the second forward offset and the second backward offset to specify a beginning boundary of a segment of the show and an ending boundary of the segment of the show.

2. The method of claim 1, further comprising: identifying a first video location within the first audio/video stream, the first video location corresponding to the beginning boundary; and identifying a second video location within the first audio/video stream, the second video location corresponding to the ending boundary.

3. The method of claim 1, further comprising:

identifying substitute content to present in association with the segment of the show; and outputting a second audio/video stream for presentation on a display device, the second audio/video stream including the segment of the show and the substitute content.

4. The method of claim 3, wherein outputting the second audio/video stream comprises replacing the at least one interstitial of the show with the substitute content.

5. The method of claim 1, wherein:

the first forward offset and the first backward offset are each specified relative to a beginning of the first unique text string; and the second forward offset and the second backward offset are each specified relative to a beginning of the second unique text string.

6. A receiving device comprising:

a communication interface that receives a first audio/video stream including at least one segment of a show, at least one interstitial of the show, and closed captioning data associated with the first audio/video stream;

a storage unit that stores the first audio/video stream and the closed captioning data;

control logic that:

receives autonomous location information separately from the first audio/video stream, the autonomous location information comprising a first unique text string, a second unique text string, a first forward offset associated with the first unique text string, a first backward offset associated with the first unique text string, a second forward offset associated with the second unique text string, and a second backward offset associated with the second unique text string;

reviews the closed captioning data to locate the first unique text string;

determines that the first unique text string is not located within the closed captioning data;

in response to determining that the first unique text string is not located within the closed captioning data, reviews the closed captioning data again to locate the second unique text string;

determines that the second unique text string is located within the closed captioning data; and in response to determining that the second unique text string is located within the closed captioning data, utilizes the second forward offset and the second backward offset to specify a beginning boundary of a segment of the show and an ending boundary of the segment of the show;

identifies substitute content to present in association with the segment of the show; and an audio/video interface that outputs a second audio/video stream for presentation on a display device, the second audio/video stream including the segment of the show and the substitute content.

7. The receiving device of claim 6, wherein the control logic sorts the closed captioning data according to a presentation order of the closed captioning data and stores the sorted closed captioning data in a data file separate from the first audio/video stream.

8. The receiving device of claim 6, wherein the audio/video interface replaces the at least one interstitial with the substitute content when outputting the second audio/video stream.

9. The receiving device of claim 6, wherein the audio/video interface outputs the substitute content before the segment of the show in the second audio/video stream.

10. The method of claim 6, wherein:

the first forward offset and the first backward offset are each specified relative to a beginning of the first unique text string; and the second forward offset and the second backward offset are each specified relative to a beginning of the second unique text string.

* * * * *